US012592071B2

(12) United States Patent
Wang et al.

(10) Patent No.: US 12,592,071 B2
(45) Date of Patent: Mar. 31, 2026

(54) METHOD, DEVICE, AND COMPUTER PROGRAM PRODUCT FOR DETERMINING NODE OF DECISION TREE

(71) Applicant: Dell Products L.P., Round Rock, TX (US)

(72) Inventors: Zijia Wang, Weifang (CN); Zhisong Liu, Shenzhen (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 18/522,570

(22) Filed: Nov. 29, 2023

(65) Prior Publication Data

US 2025/0139958 A1     May 1, 2025

(30) Foreign Application Priority Data

Oct. 27, 2023     (CN) ......................... 202311417637.6

(51) Int. Cl.
*G06V 10/82*          (2022.01)
*G06V 10/70*          (2022.01)
(Continued)

(52) U.S. Cl.
CPC ............ *G06V 10/82* (2022.01); *G06V 10/751* (2022.01); *G06V 10/761* (2022.01); *G06V 10/87* (2022.01)

(58) Field of Classification Search
CPC .... G06V 10/82; G06V 10/751; G06V 10/761; G06V 10/87; G06F 18/24323; G06N 5/01
See application file for complete search history.

(56) References Cited

U.S. PATENT DOCUMENTS

| 10,949,718 B2 * | 3/2021 | Costabello ....... G06V 30/19173 |
| 12,210,835 B2 * | 1/2025 | Xiong ................... G06F 40/284 |
| 2024/0346339 A1 * | 10/2024 | Shtok .................. G06F 16/9024 |

OTHER PUBLICATIONS

P. Xu et al., "Multimodal Learning with Transformers: A Survey," arXiv:2206.06488v2, May 10, 2023, 21 pages.
(Continued)

*Primary Examiner* — Phuoc Tran
(74) *Attorney, Agent, or Firm* — Ryan, Mason & Lewis, LLP

(57)          ABSTRACT

Embodiments of the present disclosure relate to a method, a device, and a computer program product for determining a node of a decision tree. The method includes determining multiple features of multiple modals corresponding to input information. The method further includes generating a multi-modal feature representation by combining the multiple features of the multiple modals. The method further includes determining a target path in a decision tree that is associated with the multi-modal feature representation, the decision tree comprising multiple nodes. The method further includes determining, in the target path based on the multi-modal feature representation, a target node associated with the input information and used to indicate a question or an answer. This method enables the fusion of feature representations corresponding to input information of different modals to determine a multi-modal feature representation. In this way, it is possible to determine richer and more accurate user intentions.

20 Claims, 7 Drawing Sheets

(51) Int. Cl.
   G06V 10/74        (2022.01)
   G06V 10/75        (2022.01)

(56)                References Cited

OTHER PUBLICATIONS

A. Vaswani et al., "Attention Is All You Need," arXiv:1706.03762v5, 31st Conference on Neural Information Processing Systems, Dec. 6, 2017, 15 pages.

J. Devlin et al., "BERT: Pre-training of Deep Bidirectional Transformers for Language Understanding," arXiv:1810.04805v2, May 24, 2019, 16 pages.

T. B. Brown et al., "Language Models are Few-Shot Learners," 34th Conference on Neural Information Processing Systems, Dec. 2020, 25 pages.

A. Dosovitskiy et al., "An Image is Worth 16×16 Words Transformers for Image Recognition at Scale," The International Conference on Learning Representations, arXiv:2010.11929v2, Jun. 3, 2021, 22 pages.

H. Touvron et al., "Training Data-Efficient Image Transformers & Distillation Through Attention," arXiv:2012.12877v2, Jan. 15, 2021, 22 pages.

J. Lu et al., "ViLBERT: Pretraining Task-Agnostic Visiolinguistic Representations for Vision-and-Language Tasks," 33rd Conference on Neural Information Processing Systems, Dec. 2019, 11 pages.

C. Sun et al., "VideoBERT: A Joint Model for Video and Language Representation Learning," 2019 IEEE/CVF International Conference on Computer Vision (ICCV), Oct. 2019, pp. 7464-7473.

Z. Lipton et al., "BBQ-Networks: Efficient Exploration in Deep Reinforcement Learning for Task-Oriented Dialogue Systems," The Thirty-Second AAAI Conference on Artificial Intelligence, Feb. 2018, pp. 5237-5244.

H. He et al., "Learning to Search in Branch and Bound Algorithms," Proceedings of the 27th International Conference on Neural Information Processing Systems, Dec. 2014, 9 pages.

J. L. Ba et al., "Layer Normalization," arXiv:1607.06450v1, Jul. 21, 2016, 14 pages.

K. He et al., "Deep Residual Learning for Image Recognition," IEEE Conference on Computer Vision and Pattern Recognition (CVPR), Jun. 2016, pp. 770-778.

I. Sutskever et al., "Sequence to Sequence Learning with Neural Networks," Proceedings of the 27th International Conference on Neural Information Processing Systems, vol. 2, Dec. 2014, pp. 3104-3112.

* cited by examiner

METHOD, DEVICE, AND COMPUTER PROGRAM PRODUCT FOR DETERMINING NODE OF DECISION TREE

RELATED APPLICATION

The present application claims priority to Chinese Patent Application No. 202311417637.6, filed Oct. 27, 2023, and entitled "Method, Device, and Computer Program Product for Determining Node of Decision Tree," which is incorporated by reference herein in its entirety.

FIELD

Embodiments of the present disclosure relate to the multimodal field and, more specifically, to a method, a device, and a computer program product for determining a node of a decision tree.

BACKGROUND

A decision tree is a tree structure consisting of a root node, edges, internal nodes, and leaf nodes. Among them, on the nodes of the decision tree, there are questions or solutions for user questions. A decision tree contains multiple paths, wherein a path is a sequence of nodes starting from the root node or an internal node and ending at a leaf node or an internal node. Different paths represent different solutions.

SUMMARY

Embodiments of the present disclosure relate to a method, a device, and a computer program product for determining a node of a decision tree.

According to a first aspect of the present disclosure, a method for determining a node of a decision tree is provided. The method includes: determining multiple features of multiple modals corresponding to input information; generating a multi-modal feature representation by combining the multiple features of the multiple modals; determining a target path in a decision tree that is associated with the multi-modal feature representation, the decision tree including multiple nodes; and determining, in the target path based on the multi-modal feature representation, a target node associated with the input information and used to indicate a question or an answer. By using this method, it is possible to process information of different modals in the input information inputted by the user and determine the multi-modal feature representation corresponding to the input information. In this way, by integrating questions of different forms inputted by the user, it is possible to determine richer and more accurate user intentions. Moreover, using the multi-modal feature representation as a basis for traversing the decision tree to determine the target node can improve the traversal efficiency on the one hand, and improve the relevance of the target node to the input information on the other hand, thereby providing the user with the best question and solution.

According to a second aspect of the present disclosure, an electronic device for determining a node of a decision tree is provided. The electronic device includes at least one processor, and a memory coupled to the at least one processor and having instructions stored therein, wherein the instructions, when executed by the at least one processor, cause the electronic device to perform actions including: determining multiple features of multiple modals corresponding to input information; generating a multi-modal feature representation by combining the multiple features of the multiple modals; determining a target path in a decision tree that is associated with the multi-modal feature representation, the decision tree including multiple nodes; and determining, in the target path based on the multi-modal feature representation, a target node associated with the input information and used to indicate a question or an answer.

According to a third aspect of the present disclosure, a computer program product is provided. The computer program product is tangibly stored on a non-transitory computer-readable storage medium and includes machine-executable instructions, wherein the machine-executable instructions, when executed by a machine, cause the machine to perform steps of the method in the first aspect of the present disclosure.

This Summary is intended to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
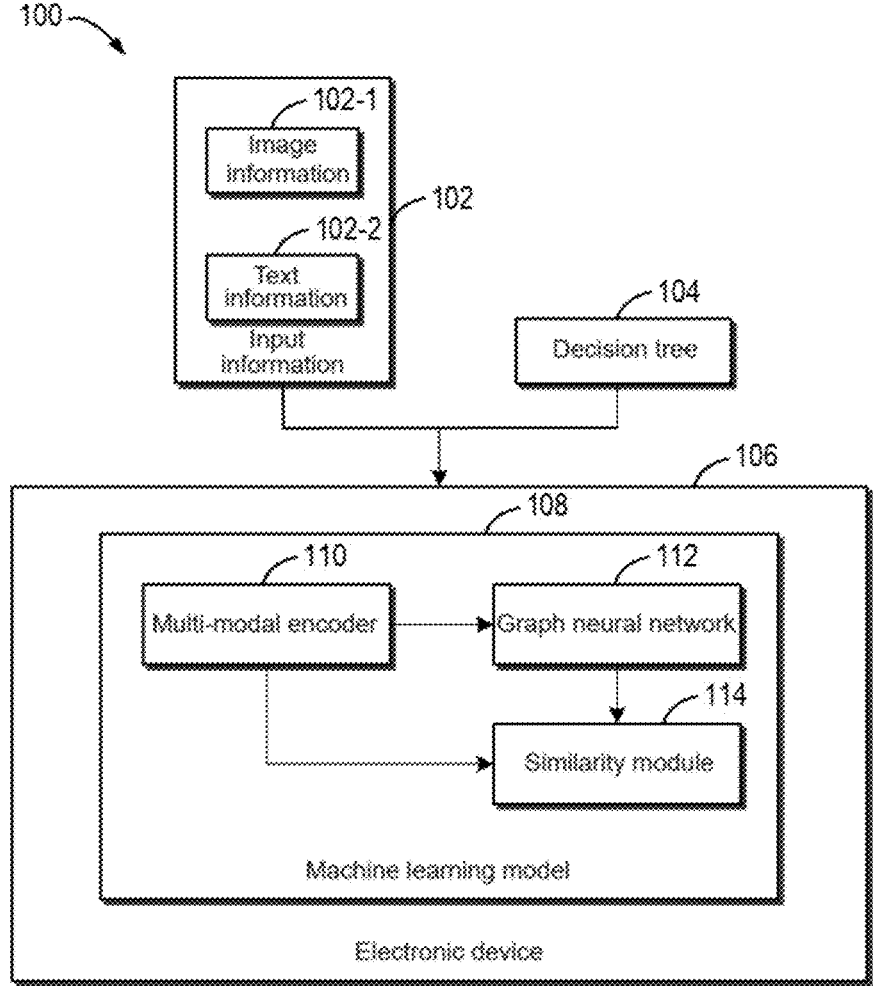
FIG. 1 illustrates a schematic diagram of an example environment in which embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

A decision tree is a prediction model that represents a mapping relationship between object attributes and object values. Each node in the tree represents a certain object, and each path represents a certain possible attribute value. Each leaf node corresponds to the value of an object represented by the path from the root node to that leaf node. In general, decision trees may be used in user services, such as to provide a user with the best question or solution to a question posed by the user.

When applying a decision tree to a user service, different users may have different questions and may pose the questions or requests in different manners. For example, questions can be posed using text, speech, visuals, and/or in other manners. Technicians need to use different models to encode questions posed by users and traverse the decision tree based on the encoded questions to provide the most relevant questions or solutions to users. In this way, on the one hand, building multiple models requires the use of a large number of processing resources, thus incurring processing costs. On the other hand, user questions in a single form provide a small amount of information, thus making it difficult to find the most relevant questions or solution answers when traversing the decision tree to the extent that it is difficult to provide satisfactory service to customers.

At least to address the above and other potential problems, embodiments of the present disclosure provide a method for determining a node of a decision tree, the method including: determining multiple features of multiple modals corresponding to input information. generating a multi-modal feature representation by combining the multiple features of the multiple modals; determining a target path in a decision tree that is associated with the multi-modal feature representation, the decision tree including multiple nodes; and determining, in the target path based on the multi-modal feature representation, a target node associated with the input information and used to indicate a question or an answer. By using this method, it is possible to process information of different modals in the input information inputted by the user and determine the multi-modal feature representation corresponding to the input information. In this way, by integrating questions of different forms inputted by the user, it is possible to determine richer and more accurate user intentions. Moreover, using the multi-modal feature representation as a basis for traversing the decision tree to determine the target node can improve the traversal efficiency on the one hand, and improve the relevance of the target node to the question inputted by the user on the other hand, thereby providing the user with the best question and solution.

The fundamental principles and several example embodiments of the present disclosure will be described in detail below with reference to the accompanying drawings. FIG. 1 illustrates a schematic diagram of an example environment 100 in which a device and/or a method according to embodiments of the present disclosure can be implemented. It should be understood that the numbers and arrangement of components, elements, and systems illustrated in FIG. 1 are examples only, and the architectural diagram may include different numbers and different arrangements of the components, elements, and systems.

The example environment 100 of FIG. 1 includes input information 102, a decision tree 104, an electronic device 106, and a machine learning model 108. The machine learning model 108 includes a multi-modal encoder 110, a graph neural network 112, and a similarity module 114. In the example environment 100, the input information 102 is a request or a question inputted by a user, such as "the computer fan is broken" or "what to do when the computer runs too slowly." The information in the input information 102 may be in different modals. For example, as shown in FIG. 1, the input information 102 includes image information 102-1 and text information 102-2. Here, modal refers to some ways of expressing or perceiving things, and every source or form of information can be called a modal. For example, the modal of the input information may be visual, speech, text, and so on. By way of example, the input information may be an image, a natural language text, or a speech sequence.

In the example environment 100, the machine learning model 108 may traverse the decision tree 104 based on the input information 102 to determine a target node in the decision tree 104 that is most relevant to the input information 102. Nodes in the decision tree may contain questions or answers corresponding to the questions inputted by the user, and after the target node is determined, the user may be provided with the best question or solution answer based on that target node.

It should be understood that the types and numbers, the data transmission process, the arrangement, etc., of models illustrated in FIG. 1 are merely examples, and that the example environment 100 may include different numbers of models arranged in different ways, data transmission processes, various additional elements, and the like. It should be understood that the above examples are only intended to illustrate the application of the machine learning model 108. As technology evolves, the machine learning model 108 can include a variety of known or unknown applications in various fields and aspects.

In the example environment 100, the machine learning model 108 may be installed in any electronic device having processing computing resources or storage resources. For example, the electronic device may have common capabilities such as receiving and sending data requests, real-time data analysis, local data storage, real-time network connectivity, and the like. The electronic device may typically include various types of devices. Examples of the electronic device may include, but are not limited to: desktop computers, laptop computers, smartphones, wearable devices, security devices, smart manufacturing devices, smart home devices, Internet of Things devices, smart cars, drones, and the like, which is not limited in the present disclosure in any way.

Figure 2:
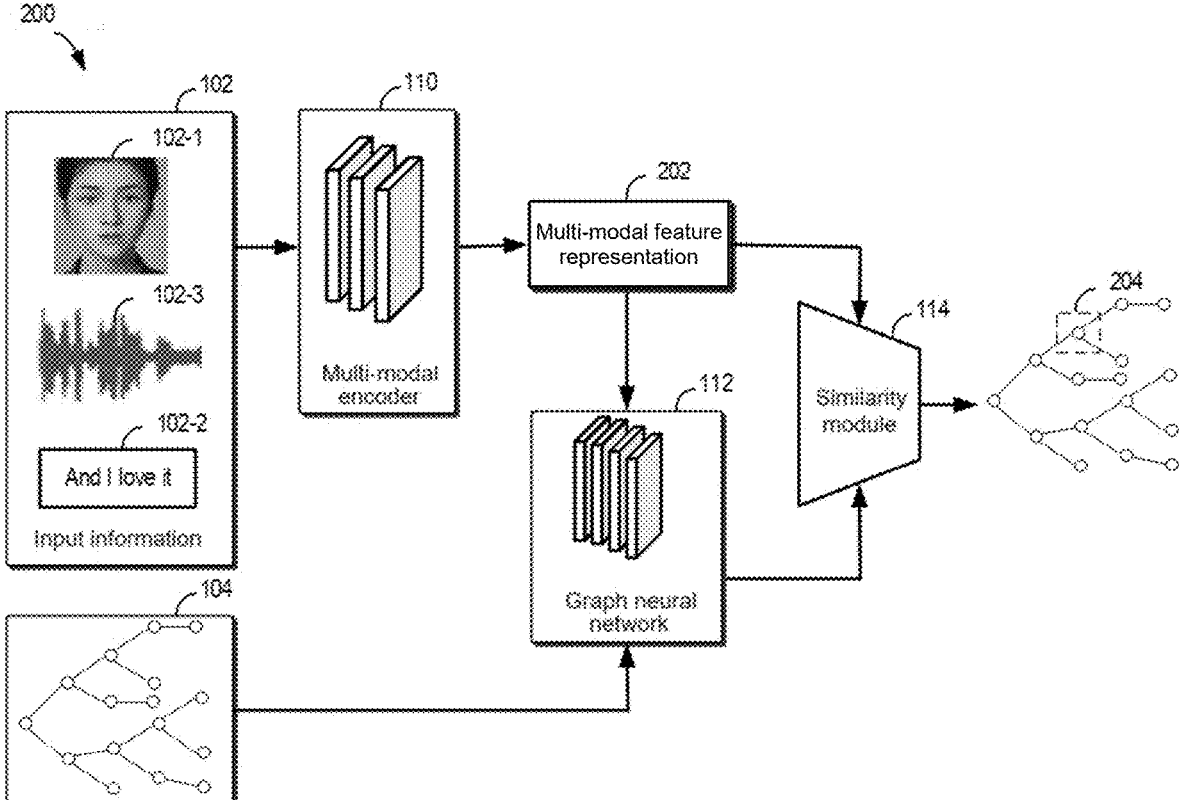
FIG. 2 illustrates a schematic diagram of a process for determining a node of a decision tree using a machine learning model according to embodiments of the present disclosure.

FIG. 2 illustrates a schematic diagram of a process 200 for determining a node of a decision tree using a machine learning model according to embodiments of the present disclosure. As shown in FIG. 2, the multi-modal encoder 110 may encode information of different modals (e.g., image information 102-1, text information 102-2, and audio information 102-3 shown in FIG. 2) of the input information 102 to obtain multiple features (not shown) of the multiple modals. In addition, the multi-modal encoder 110 may fuse the multiple features of the multiple modals to determine a multi-modal feature representation 202.

By way of example, the multi-modal encoder 110 may be a deep learning model capable of processing information of multiple modals, which may take advantage of the correlation between different modals to improve the representational capability and the generalization capability. The multi-modal encoder 110 is used to perform interaction and fusion of the multiple features of the different modals. The multi-modal encoder 110 may be adapted to different downstream tasks such as visual question answering, image retrieval, machine translation, and others, by means of pre-training and fine-tuning.

As shown in FIG. 2, the graph neural network 112 can encode the decision tree 104 and determine the decision tree features corresponding to the decision tree, wherein the decision tree feature representation contains information about all edges and all nodes of the decision tree 104. The multi-modal feature representation 202 determined by the multi-modal encoder 110 may be inputted into the graph neural network 112, and the multi-modal feature representation 202 may be used as a traversal basis for the graph neural network 112. In some embodiments, the graph neural network 112 may learn a complex traversal strategy to search in the decision tree for a target path (not shown) associated with the multi-modal feature representation, where the target path refers to a sequence of nodes formed by nodes at different depths and corresponding edges.

As shown in FIG. 2, in order to further determine the nodes that may be most relevant to the input information, the similarity module 114 may be utilized to filter the nodes in the target path based on the multi-modal feature representation 202, so as to determine the target node 204 associated with the multi-modal feature representation 202, thereby providing the user with a more accurate and satisfactory question or answer. For example, the similarity module 114 may be utilized to determine a similarity between the multi-modal feature representation 202 and each node in the target path. Afterwards, one or more nodes with higher similarities can be selected as the target node 204 based on the ranking among the similarities.

In this way, when applying this machine learning model to a user service, the information of different modals inputted by a user can be fused to fully capture information about the connectivity between the different modals, and a number of metrics are introduced to make the user intention that may be contained in the multi-modal feature representation obtained after fusion more accurate and richer. In addition, in the process of determining the multi-modal feature representation, utilizing the same encoder (e.g., the multi-modal encoder 110 shown in FIG. 1) to encode information of different modals can save processing resources and processing costs. Moreover, using the multi-modal feature representation as a traversal basis for traversing the decision tree to determine the target node can improve the traversal efficiency and reduce the time and cost of the user service on the one hand, and improve the relevance of the target node to the question inputted by the user on the other hand, thereby providing the user with the best solution. This clearly can enhance the performance and efficiency of various types of user services and increase the user's comfort level when using them.

Figure 3:
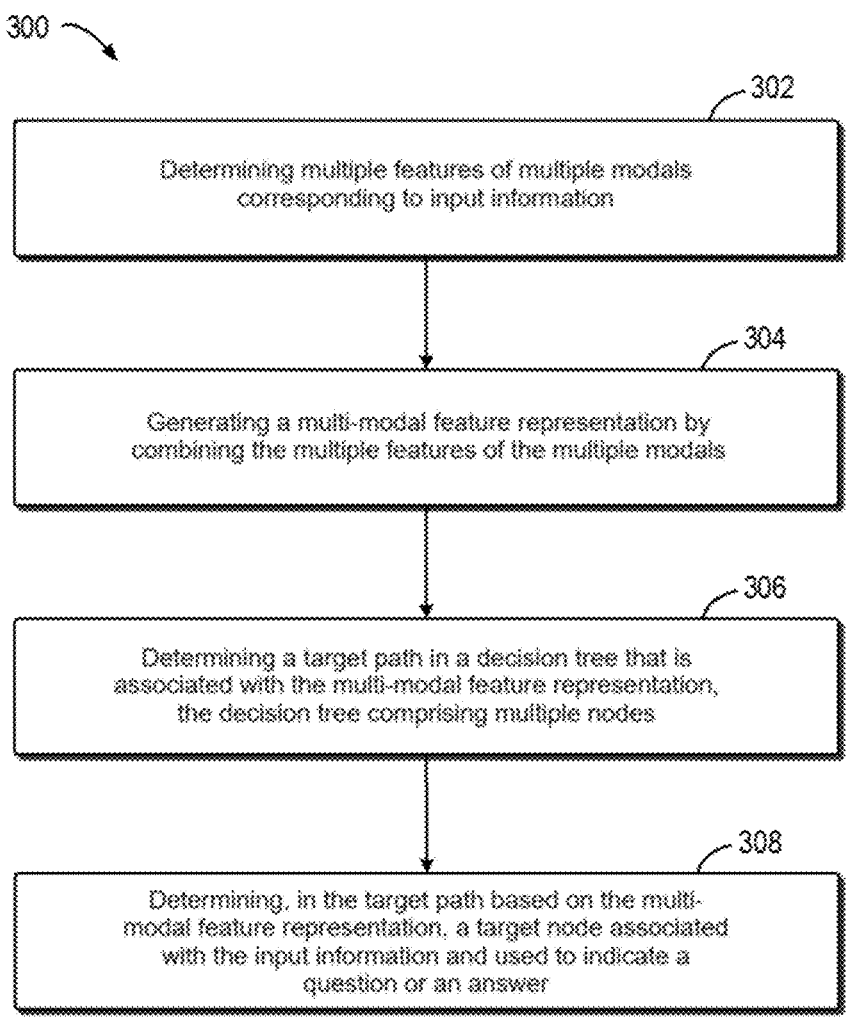
FIG. 3 illustrates a flow chart of a method for determining a node of a decision tree according to embodiments of the present disclosure.

FIG. 3 illustrates a flow chart of a method 300 for determining a node of a decision tree according to embodiments of the present disclosure. Using the machine learning model 108 shown in FIG. 1, a target node in the decision tree that is associated with the input information and used to indicate a question or an answer can be determined based on the decision tree and the input information.

In block 302, the input information may include information of a variety of modals, for example, the input information includes visual information, text information, and speech information. The input information may be inputted by a user to represent the user's needs. By way of example, the input information may be an image, a speech sequence, and a text consisting of multiple words. The input information of different modals may represent the user's needs from multiple dimensions. Among other things, the multiple modals mean utilizing multiple modals to describe a request made by the same user, such as video, images, speech, text, etc., describing a particular request. Alternatively, the multiple modals may also be homogeneous modals, such as multiple images captured in two types of cameras, infrared images, and visible light images.

In some embodiments, the multiple features corresponding to the input information may be image features, text features, and speech features corresponding to the input information, or infrared image features, visible light image features, and the like corresponding to the input information. The features of different modals can represent the input information from different dimensions.

In some approaches, information of different modals is encoded using different uni-modal encoders to obtain features of the corresponding modals. For example, text information is encoded using a text encoder to determine text features corresponding to the text information. An image is encoded using an image encoder to determine image features corresponding to the image. However, in approaches of this type, encoding using multiple uni-modal encoders not only leads to the problems of wasted resources and increased processing costs, but also ignores information about the connectivity between information of different modals, thus making it impossible to accurately determine the user intention to the extent that an accurate solution cannot be provided to the user.

Therefore, in some embodiments, the same multi-modal encoder (e.g., the multi-modal encoder 110 shown in FIG. 1) may be utilized to encode the information of different modals to determine the features corresponding to the information of each modal, for example, text features, image features, speech features, and the like. Alternatively, the multiple modals may also refer to different homogeneous modals, such as multiple images captured in two types of cameras, infrared images, and visible light images. The multi-modal encoder illustratively uses an attention mechanism-based machine learning model. This multi-modal encoder may include a self-attention layer, a cross-attention (cross-modal) layer, and a fully-connected feed-forward network (FFN) layer. Among them, the fully-connected feed-forward network layer may include multiple linear layers as well as a fully-connected layer (activation function).

In block 304, after determining the multiple features of the multiple modals, the multiple features of the multiple modals may be fused to generate a multi-modal feature representation based on complementarity among the multiple modals. In some embodiments, the multi-modal feature representation may be a joint representation, wherein the joint representation means that the features of the multiple modals are mapped together into the same multi-modal vector space to obtain a fused feature representation. By way of example, the inputs of the multiple modals are $x_1$, $x_2$, ..., and $x_n$, and the joint representation is $x_m = f(x_1, x_2, ..., x_n)$. In this way, inter-modal relationships between information of different modals can be better captured, and a multi-modal feature representation containing more information can be determined. The multi-modal feature representation may include features extracted from the information of the different modals (e.g., image, text, audio, etc.) of the input information that are capable of expressing the same or associated semantic information.

In block 306, the multi-modal feature representation may be used as a traversal basis for traversing the decision tree to determine a target path associated with the multi-modal feature representation. Here, the decision tree contains a root node, internal nodes, and leaf nodes, wherein the leaf nodes are nodes with the highest depth in the decision tree, and each leaf node includes an answer that may be relevant to the input information. The internal nodes include questions that may be relevant to the input information. The nodes are connected to one another by edges. The target path contains multiple nodes, and a path is formed from a node with the lowest depth to a node with the highest depth. It can be understood that each node in the target path is associated with a multi-modal feature representation. In some embodiments, there may be multiple target paths.

In block 308, since there may be multiple target paths and a target path may contain multiple nodes, in order to find the target node that is closest to and most relevant to the input information in the decision tree, the nodes in the target path may be further filtered using the multi-modal feature representation to determine the target node. In this way, the user may subsequently be asked a question or provided with a solution in accordance with the question or answer corresponding to a node at the next depth to the target node in the decision tree.

In some embodiments, in order to facilitate similarity comparisons between the multi-modal feature representation and the nodes in the decision tree, the decision tree may be encoded using a graph neural network to determine decision tree features of the decision tree, wherein the decision tree features may include embeddings of multiple nodes, such as an embedding of the root node, embeddings of leaf nodes, and embeddings of internal nodes. Here, the network architecture of the graph neural network may be an attention mechanism-based architecture. In some embodiments, the graph neural network may include a self-attention layer, an interactive attention layer, and an FFN layer. The self-attention layer may calculate an attention weight between each pair of nodes in the output sequence and produce an output sequence of the same length. The interactive attention layer may calculate an attention weight between each node in the output sequence and the multi-modal feature representation.

In some embodiments, the graph neural network may convert the decision tree to a directed acyclic graph (DAG) form and may encode the directional acyclic graph form into decision tree features corresponding to the decision tree. By way of example, the graph neural network may be trained based on a loss function to adjust network parameters of the graph neural network, wherein the loss function may include a cross entropy loss function, a hinge loss function, and the like.

In the above manner, the information of different modals inputted by the user can be fused to fully capture information about the connectivity between different modals, so that the multi-modal feature representation obtained after fusion may contain more accurate and richer user intentions. Moreover, using the multi-modal feature representation as a traversal basis for traversing the decision tree to determine the target node can improve the traversal efficiency and reduce the time and cost of the customer service on the one hand, and improve the relevance of the target node to the question inputted by the user on the other hand, thereby providing the user with the best solution. This clearly can enhance the user experience.

Some embodiments of the present disclosure will be described in detail below in conjunction with FIGS. 4 to 7. For ease of understanding, specific embodiments mentioned in the following description are all examples and are not intended to limit the protection scope of the present disclosure. It should be understood that embodiments described below may also include additional actions not shown and/or may omit actions shown, and the scope of the present disclosure is not limited in this regard.

Figure 4:
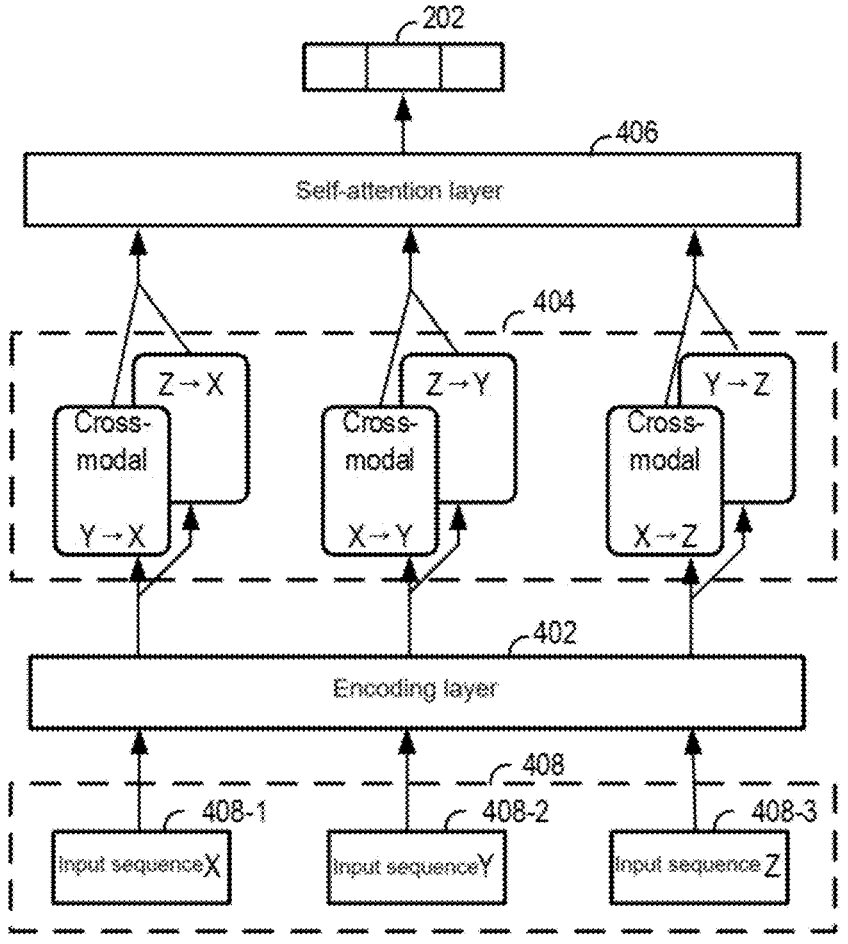
FIG. 4 illustrates a schematic diagram of a process for determining a multi-modal feature representation according to embodiments of the present disclosure.

FIG. 4 illustrates a schematic diagram of a process for determining a multi-modal feature representation according to embodiments of the present disclosure. As shown in FIG. 4, the multi-modal encoder 110 includes an encoding layer 402, an interactive attention layer 404, and a self-attention layer 406. Among them, the core components of the interactive attention layer 404 and the self-attention layer 406 are attention models. The attention models often take a QKV (Query-Key-Value) pattern to determine an output sequence corresponding to an input sequence. For example, given an input sequence $X=[x_1, \ldots, x_N] \in R^{D_x \times N}$, the output sequence after the processing by the attention model is $H=[h_1, \ldots, h_N] \in R^{D_v \times N}$, and the specific calculation process is as described below.

First, the input sequence is mapped to three different spaces to obtain a query matrix Q, a key matrix K, and a value matrix V:

$$Q = W_q X \in R^{D_k \times N} \tag{1}$$

$$K = W_k X \in R^{D_k \times N} \tag{2}$$

$$V = W_v X \in R^{D_v \times N} \tag{3}$$

where $W_q$, $W_k$, and $W_v$ are the adjustable parameters of the attention model, and $D_k$ is the dimension of the key matrix.

Then, the output sequence H can be obtained according to the attention mechanism:

$$H = V \ \text{softmax}\left(\frac{K^T Q}{\sqrt{D_k}}\right) \tag{4}$$

where softmax( ) is the function normalized by columns.

As shown in FIG. 4, the encoding layer 402 may utilize a cosine function or a sine function to correspondingly encode a sequence 408 corresponding to the input information. For example, an input sequence X 408-1 corresponding to the image in the input information may be encoded, an input sequence Y 408-2 corresponding to the speech in the input information may be encoded, and an input sequence Z 408-3 corresponding to the text in the input information may be encoded, so as to obtain multiple encoded embeddings (not shown).

The multiple encoded embeddings are input to the interactive attention layer 404. The interactive attention layer 404 may determine, for a pair of modals formed by any two modals, a multi-modal vector corresponding to the two modals using a cross-attention calculation formula. For example, a multi-modal feature vector $H_{X-Y}$ may be determined using the cross-attention formula by taking the input sequence X 408-1 corresponding to the image in the input information as a query matrix and taking the input sequence Y 408-2 corresponding to the speech in the input information as a key matrix:

$$Q_X = XW_{qX} \tag{5}$$

$$K_Y = YW_{qY} \tag{6}$$

$$V_Y = YW_{qY} \tag{7}$$

$$A_{X-Y} = \mathrm{softmax}\left(\frac{Q_X K_Y^T}{\sqrt{d_k}}\right) \tag{8}$$

$$H_{X-Y} = A_{X-Y} V_Y W_{qX} \tag{9}$$

where $A_{X-Y}$ is a cross-attention matrix. It can be understood that the multi-modal feature vector between the other two modals may be similarly determined in accordance with calculations based on the above formulas.

In the above manner, the cross-modal fusion of the features of two modals can be performed using the pairwise cross-modal mechanism. The multi-modal feature representation after the fusion of the multiple modals is obtained by continuously introducing the features of other modals to strengthen the features of the target modal.

As shown in FIG. 4, after multiple multi-modal feature vectors (e.g., $H_{X-Y}$, $H_{Z-Y}$, and $H_{Y-X}$) between multiple pairs of modals are determined, the multiple multi-modal feature vectors outputted from the interactive attention layer 404 may be inputted into the self-attention layer 406, and a final joint representation (multi-modal feature representation) is obtained after processing through the self-attention layer 406 and the feed-forward sublayer (not shown). In this way, semantic alignment and complementarity between different modals can be fully captured, thereby making the user intention contained in the final joint representation obtained more accurate.

In some embodiments, the multi-modal encoder may be pre-trained by means of self-supervision, for example, a masked language modeling (MLM) approach and a masked modal modeling (MMM) approach. Among them, the masked language modeling can randomly mask some tokens of natural language modals and predict them based on the contextual information of other modals. The masked modal modeling can randomly completely mask one modal and predict them based on contextual information of other modals. Taking the masked language modeling as an example, the masked language modeling is used for pre-training, and it not only can learn the relationship inherent in the natural language text, but also can combine the visual information with the natural language text. Based on the experience, the masking percentage may be set to 15%.

The loss function of MLM may be defined as:

$$L_{MLM} = -\sum_{i=1}^{n} \mathbb{I}(x_i \text{ is masked}) \log P(x_i \mid X_{\setminus i}, Y) \tag{10}$$

where $X=(x_1, x_2, \ldots, x_n)$ is the input sequence, $Y=(y_1, y_2, \ldots, y_n)$ is the output sequence, $x_i$ is the masked embedding, and X is the remaining sequence of the input sequence other than $x_i$.

In addition, the loss function of MMM may be defined as:

$$L_{MMM} = -\sum_{j=1}^{m} \log P(y_j \mid X) \tag{11}$$

where $X=(x_1, x_2, \ldots, x_n)$ is the input sequence, and $y_i$ is the masked embedding.

In some embodiments, the multi-modal encoder may be trained using unlabeled sample image features and sample text features to determine the trained multi-modal encoder, wherein the sample image features and the sample text features are feature representations for the same target object. For example, a multi-modal encoder may be constructed, which contains multiple adjustable network parameters. Afterwards, the sample image features and the sample text features may be inputted into the multi-modal encoder, and the sample image features and the sample text features may be fused via the multi-modal encoder to obtain the multi-modal sample feature.

Furthermore, the multi-modal encoder is utilized to randomly mask some token embeddings of the sample text features and predict the token embeddings based on the contextual information of other modals to obtain the predicted sample text features. Afterwards, the predicted text features and the sample image features can be fused to obtain the predicted multi-modal sample features (predicted results). Finally, the network parameters can be iteratively adjusted based on the differences between the predicted multi-modal sample features and the multi-modal sample features until the differences meet the preset requirements. In this case, the differences between the predicted multi-modal sample features and the multi-modal sample features can be determined based on the loss function. The differences satisfying the preset requirements may be that the number of iterative adjustments is greater than a set number of times, or that the differences are less than a set difference value.

With such a training approach, a joint representation that captures both intra-modal and inter-modal dependencies can be trained using a large amount of unlabeled data from different modals. Moreover, the usability and generalizability of multi-modal encoders can be improved.

Figure 5:
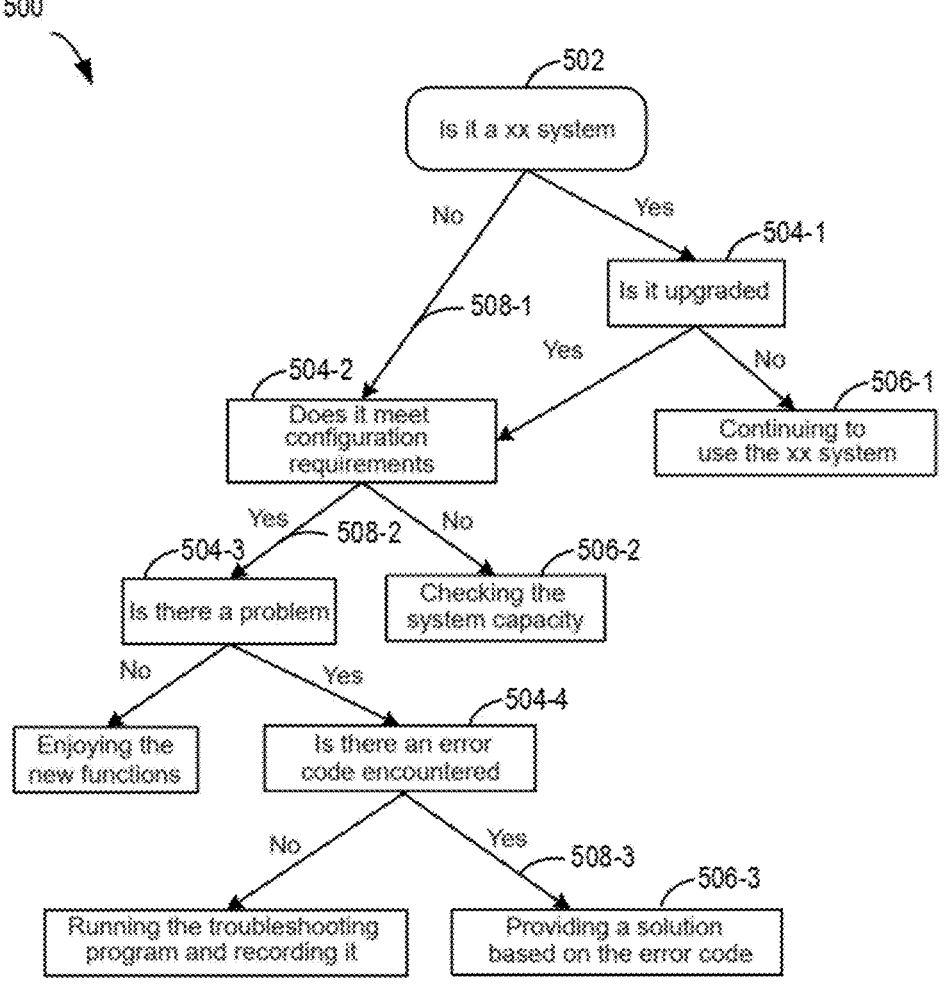
FIG. 5 illustrates a schematic diagram of the structure of a decision tree according to embodiments of the present disclosure.

In some embodiments, a decision tree has a broad depth and a complex structure, and traversing the decision tree requires a lot of processing resources and a long processing time. In order to improve the traversal efficiency and save the traversal time, in some embodiments, a beam search algorithm can be utilized to traverse the decision tree based on the multi-modal feature representation to determine the target path. Before the process of traversing the decision tree is explained, the structure of a decision tree is illustrated with reference to FIG. 5. FIG. 5 illustrates a schematic diagram of the structure of a decision tree 500 according to embodiments of the present disclosure.

As shown in FIG. 5, the decision tree 500 includes a root node 502, multiple internal nodes (e.g., 504-1, 504-2, 504-3, 504-4, not all of the internal nodes are labeled in FIG. 5), and multiple leaf nodes (e.g., 506-1, 506-2, 506-3, not all of the leaf nodes are labeled in FIG. 5). The root node 502 is the node with the lowest depth in the decision tree 500, and the leaf node 506-3 is the node with the highest depth in the decision tree 500. The depth of the nodes increases gradually from the root node to the leaf nodes. The nodes are connected to one another by edges (e.g., 508-1, 508-2, 508-3, etc.), wherein each leaf node includes a solution for solving the user's question. The decision tree 500 illustrated in FIG. 5 is only an example, and the number and structure of nodes may be modified as desired.

Figure 6:
FIG. 6 illustrates a schematic diagram of a process for traversing a decision tree according to embodiments of the present disclosure.
Figure 6:
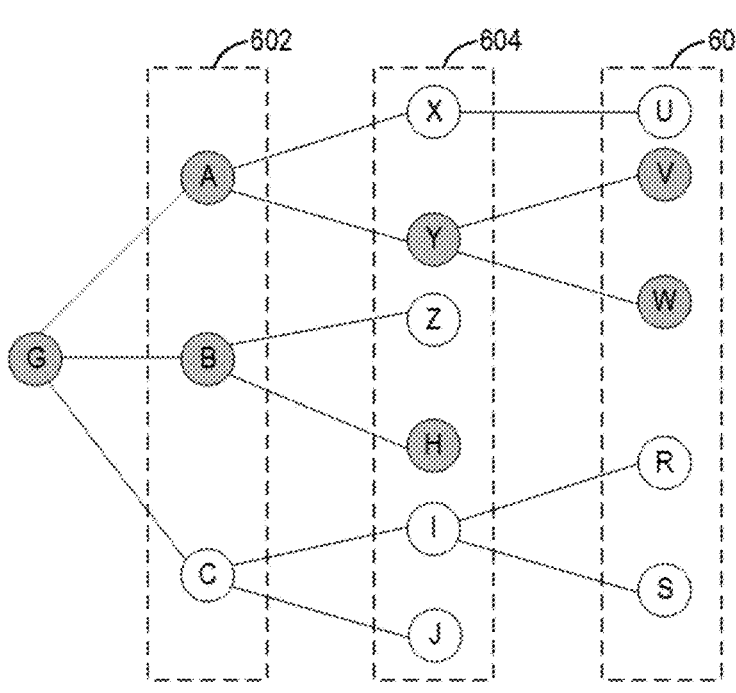

FIG. 6 illustrates a schematic diagram of a process 600 for traversing a decision tree according to embodiments of the present disclosure. As shown in FIG. 6, similarity comparison can be performed between the multi-modal feature representation and the embedding corresponding to each first node 602 at the next depth to the root node to determine M first candidate nodes (e.g., first candidate node A, second candidate node B), where M is a predetermined number that can be set by a user, for example, it can be set to 3, 5, 7, etc. By way of example, M first nodes may be selected as the first candidate nodes based on the predetermined number M from among several first nodes with high similarities.

As shown in FIG. 6, the similarity comparison continues to be performed between the multi-modal feature representation and the embedding corresponding to each second node 604 at the next depth to the first candidate nodes to determine M second candidate nodes (e.g., second candidate node Y, second candidate node H). Finally, the similarity comparison is performed between the multi-modal feature representation and the embedding corresponding to each third node 606 at the next depth to the second candidate nodes to determine M third candidate nodes (e.g., third candidate node W, third candidate node V). It will be appreciated that traversal is stopped when a node at the next depth is a leaf node, or when the traversal depth reaches a set depth.

It can be understood that after determining the multiple first candidate nodes, the multiple second candidate nodes, and the multiple third candidate nodes, multiple target paths (e.g., the target path G-A-Y-W, the target path G-A-Y-V, and the target path G-B-H) may be determined based on the connectivity relationship among the candidate nodes.

In some embodiments, in order to further determine the node that may be most relevant to the multi-modal features, the nodes may be filtered based on the similarity between the multi-modal feature representation and each node in the target paths. In this way, the target nodes associated with the multi-modal feature representation may be determined, thereby providing the user with a more accurate and satisfactory question or answer. For example, a similarity model (e.g., the similarity module 114 shown in FIG. 1) may be utilized to determine the similarity between the multi-modal feature representation and each node in the target path. Afterwards, one or more nodes with higher similarities can be selected as the target nodes based on the ranking of the similarities. By way of example, the similarity model may be trained based on a loss function to adjust network parameters of the similarity model. Here, the loss function may include a cross entropy loss function, a hinge loss function, and the like.

In some embodiments, the decision tree may be applied to a variety of scenarios, and the information included in the decision tree applicable to different application scenarios is different. For example, in an application scenario in which the decision tree is applied to medical diagnosis, the object attributes and object values included in the decision tree may be constructed based on a patient's physical signs, medical history, and other information. The nodes of the decision tree may include condition inferences and diagnosis results. In the application scenario of using a decision tree for text classification, the object attributes and object values contained in the decision tree may be determined based on various text information such as news articles, e-mails, etc., and the nodes of the decision tree may include classification results.

Therefore, before traversing the decision tree, the decision tree associated with the user request is determined based on the user request. For example, a preset correlation between the input information and an application scenario parameter may be pre-constructed, wherein the application scenario parameter may be determined based on the feature information corresponding to the decision tree. By way of example, the application scenario parameter may be "education," "medical treatment," "face recognition," and the like. Furthermore, a corresponding decision tree may be selected from multiple decision trees based on the preset correlation between the input information and the application scenario parameter.

In this way, the decision tree that is relatively relevant to the input information can be determined before traversing the decision tree, thus saving traversal resources and improving traversal efficiency.

Figure 7:
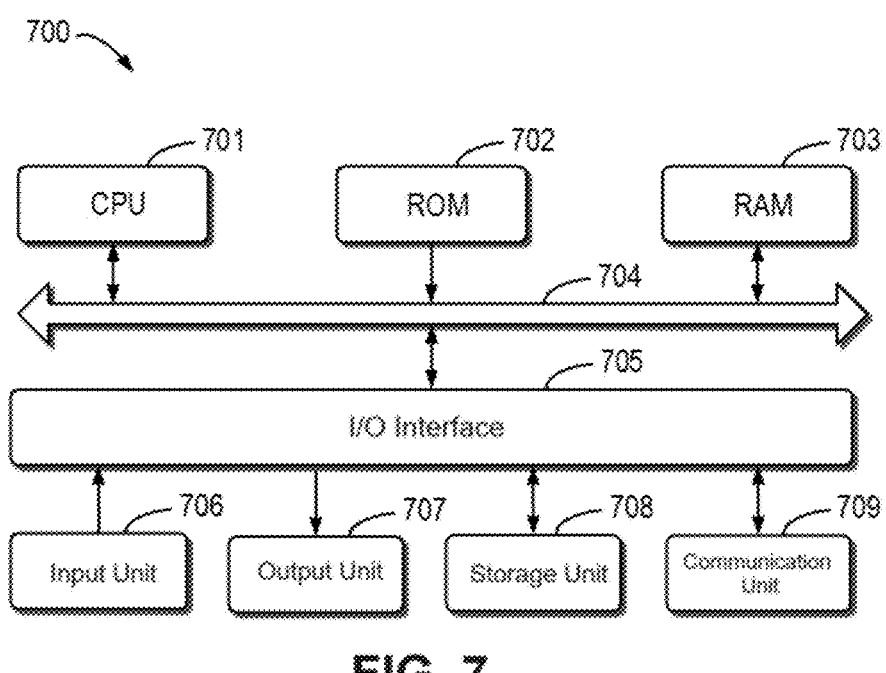
FIG. 7 illustrates a block diagram of an example device suitable for use in implementing embodiments of the present disclosure.

FIG. 7 illustrates a block diagram of an example device 700 which can be used to implement embodiments of the present disclosure. The computing device in FIG. 1 may be implemented using the device 700. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

Multiple components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as method 300, may be performed by the CPU 701. For example, in some embodiments, the method 300 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 300 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for determining a node of a decision tree, comprising:

determining multiple features of multiple modals corresponding to input information;

generating a multi-modal feature representation by combining the multiple features of the multiple modals;

determining a target path in a decision tree that is associated with the multi-modal feature representation, the decision tree comprising multiple nodes; and determining, in the target path based on the multi-modal feature representation, a target node associated with the input information and used to indicate a question or an answer;

wherein the method is performed by an electronic device, the electronic device comprising at least one processor and memory coupled to the at least one processor.

2. The method according to claim 1, wherein determining multiple features of multiple modals corresponding to input information comprises:

generating the multiple features of the multiple modals by separately encoding information of different modals in the input information via a multi-modal encoder.

3. The method according to claim 2, wherein generating a multi-modal feature representation by combining the multiple features of the multiple modals comprises:

determining a joint representation corresponding to the multiple features of the multiple modals by means of cross-modal fusion of the multiple features of the multiple modals; and determining the multi-modal feature representation according to the joint representation.

4. The method according to claim 1, wherein determining a target path in a decision tree that is associated with the multi-modal feature representation comprises:

generating decision tree features corresponding to the decision tree by encoding the decision tree via a graph neural network; and determining the target path associated with the multi-modal feature representation by comparing the decision tree features with the multi-modal feature representation.

5. The method according to claim 4, wherein generating decision tree features corresponding to the decision tree by encoding the decision tree via a graph neural network comprises:

generating multiple embeddings corresponding to the multiple nodes in the decision tree by encoding the multiple nodes via the graph neural network.

6. The method according to claim 5, wherein determining the target path associated with the multi-modal feature representation by comparing the decision tree features with the multi-modal feature representation comprises:

determining a first set of candidate nodes of a preset number based on similarities between the multi-modal feature representation and embeddings corresponding to first nodes at a next depth to a root node of the decision tree;

determining a second set of candidate nodes of the preset number based on similarities between the multi-modal feature representation and embeddings corresponding to second nodes at a next depth to each of the first set of candidate nodes;

determining an ith set of candidate nodes of the preset number by repeating the step of determining a second set of candidate nodes of the preset number based on similarities between the multi-modal feature representation and embeddings corresponding to second nodes at the next depth to each of the first set of candidate nodes, until a node at the next depth is a leaf node or the depth reaches a predetermined depth threshold, the i being greater than 2; and determining the target path based on the first set of candidate nodes, the second set of candidate nodes, and the ith set of candidate nodes.

7. The method according to claim 1, wherein the input information comprises at least two of natural language text, image data, and speech data.

8. The method according to claim 1, wherein the target path comprises multiple candidate nodes connected in sequence, and determining, in the target path based on the multi-modal feature representation, a target node associated with the input information and used to indicate a question or an answer comprises:

determining a similarity between the multi-modal feature representation and the multiple candidate nodes; and determining, from the multiple candidate nodes according to the similarity, the target node associated with the input information and used to indicate a question or an answer.

9. The method according to claim 1, further comprising:

determining an application scenario parameter associated with the input information; and selecting the decision tree matching the application scenario parameter from multiple decision trees.

10. The method according to claim 2, further comprising:

acquiring a sample text feature and a sample image feature, contents of the sample text feature being associated with contents of the sample image feature;

constructing the multi-modal encoder, the multi-modal encoder having training parameters set therein;

inputting the sample text feature and the sample image feature into the multi-modal encoder to generate a prediction result; and adjusting the training parameters iteratively based on differences of the prediction result with the sample text feature and the sample image feature until the differences satisfy preset requirements.

11. An electronic device, comprising:

at least one processor; and a memory coupled to the at least one processor and having instructions stored therein, wherein the instructions, when executed by the at least one processor, cause the electronic device to perform actions comprising:

determining multiple feature representations of multiple modals corresponding to input information;

generating a multi-modal feature representation by combining the multiple feature representations of the multiple modals;

determining a target path in a decision tree that is associated with the multi-modal feature representation, the decision tree comprising multiple nodes; and determining, in the target path based on the multi-modal feature representation, a target node associated with the input information and used to indicate a question or an answer.

12. The electronic device according to claim 11, wherein determining multiple feature representations of multiple modals corresponding to input information comprises:

generating the multiple feature representations of the multiple modals by separately encoding information of different modals in the input information via a multi-modal encoder.

13. The electronic device according to claim 12, wherein generating a multi-modal feature representation by combining the multiple feature representations of the multiple modals comprises:

determining a joint representation corresponding to the features of the multiple modals by means of cross-modal fusion of the multiple feature representations of the multiple modals; and determining the multi-modal feature representation according to the joint representation.

14. The electronic device according to claim 11, wherein determining a target path in a decision tree that is associated with the multi-modal feature representation comprises:

generating decision tree features corresponding to the decision tree by encoding the decision tree via a graph neural network; and determining the target path associated with the multi-modal feature representation by comparing the decision tree features with the multi-modal feature representation.

15. The electronic device according to claim 14, wherein generating decision tree features corresponding to the decision tree by encoding the decision tree via a graph neural network comprises:

generating multiple embeddings corresponding to the multiple nodes in the decision tree by encoding the multiple nodes via the graph neural network.

16. The electronic device according to claim 15, wherein determining the target path associated with the multi-modal feature representation by comparing the decision tree features with the multi-modal feature representation comprises:

determining a first set of candidate nodes of a preset number based on similarities between the multi-modal feature representation and embeddings corresponding to first nodes at a next depth to a root node of the decision tree;

determining a second set of candidate nodes of the preset number based on similarities between the multi-modal feature representation and embeddings corresponding to second nodes at a next depth to each of the first set of candidate nodes;

determining an ith set of candidate nodes of the preset number by repeating the step of determining a second set of candidate nodes of the preset number based on similarities between the multi-modal feature representation and embeddings corresponding to second nodes at the next depth to each of the first set of candidate nodes, until a node at the next depth is a leaf node or the depth reaches a predetermined depth threshold, the i being greater than 2; and determining the target path based on the first set of candidate nodes, the second set of candidate nodes, and the ith set of candidate nodes.

17. The electronic device according to claim 11, wherein the input information comprises at least two of natural language text, image data, and speech data.

18. The electronic device according to claim 11, wherein the target path comprises multiple candidate nodes connected in sequence, and determining, in the target path based on the multi-modal feature representation, a target node associated with the input information and used to indicate a question or an answer comprises:

determining a similarity between the multi-modal feature representation and the multiple candidate nodes; and determining, from the multiple candidate nodes according to the similarity, the target node associated with the input information and used to indicate a question or an answer.

19. The electronic device according to claim 11, further comprising:

determining an application scenario parameter associated with the input information; and selecting the decision tree matching the application scenario parameter from multiple decision trees.

20. A computer program product comprising a non-transitory computer-readable storage medium storing machine-executable instructions which, when executed by a machine, cause the machine to perform actions comprising:

determining multiple features of multiple modals corresponding to input information;

generating a multi-modal feature representation by combining the multiple features of the multiple modals;

determining a target path in a decision tree that is associated with the multi-modal feature representation, the decision tree comprising multiple nodes; and determining, in the target path based on the multi-modal feature representation, a target node associated with the input information and used to indicate a question or an answer;

wherein the machine comprises an electronic device that includes at least one processor and memory coupled to the at least one processor, and further wherein the actions are performed by the electronic device.

* * * * *